United States Patent [19]

Cullen

[11] 4,404,991
[45] Sep. 20, 1983

[54] VALVE CONTROL ASSEMBLY

[75] Inventor: Mark Cullen, Rossford, Ohio

[73] Assignee: Donahue Enterprises, Inc., Minneapolis, Minn.

[21] Appl. No.: 427,929

[22] Filed: Sep. 29, 1982

[51] Int. Cl.³ .............................................. F16K 11/18
[52] U.S. Cl. .............................. 137/636.1; 74/471 XY
[58] Field of Search ................. 137/636, 636.1, 636.2, 137/636.3, 625.68; 74/471 XY

[56] References Cited

U.S. PATENT DOCUMENTS

| | | | |
|---|---|---|---|
| 978,579 | 12/1910 | Grebel et al. | 137/636.1 |
| 2,574,624 | 11/1951 | Cochin | 137/636.1 |
| 2,580,731 | 1/1952 | Cochin | 137/636.1 |
| 2,592,352 | 4/1952 | Speck | 137/636.1 |
| 2,700,904 | 2/1955 | Woods | 74/471 XY |
| 2,794,609 | 6/1957 | Perry | 137/636 |
| 2,958,233 | 11/1960 | Johnson | 137/636.2 |
| 3,496,796 | 2/1970 | Alpers et al. | 74/471 XY |
| 3,744,335 | 7/1973 | Karlsson et al. | 74/471 XY |
| 3,756,284 | 9/1973 | Breunich | 137/636 |
| 3,918,496 | 11/1975 | Byers, Jr. | 137/636.1 |

Primary Examiner—George L. Walton
Attorney, Agent, or Firm—Burd, Bartz & Gutenkauf

[57] ABSTRACT

A fluid control apparatus is manually operated to actuate one or more fluid responsive devices. The apparatus has a plate supporting a plurality of spool valves. A control rod connected to a bearing member movably mounted on the plate supports a member engageable with the actuator of the spool valves. A spring located between the plate and member biases the control rod to a neutral position.

17 Claims, 6 Drawing Figures

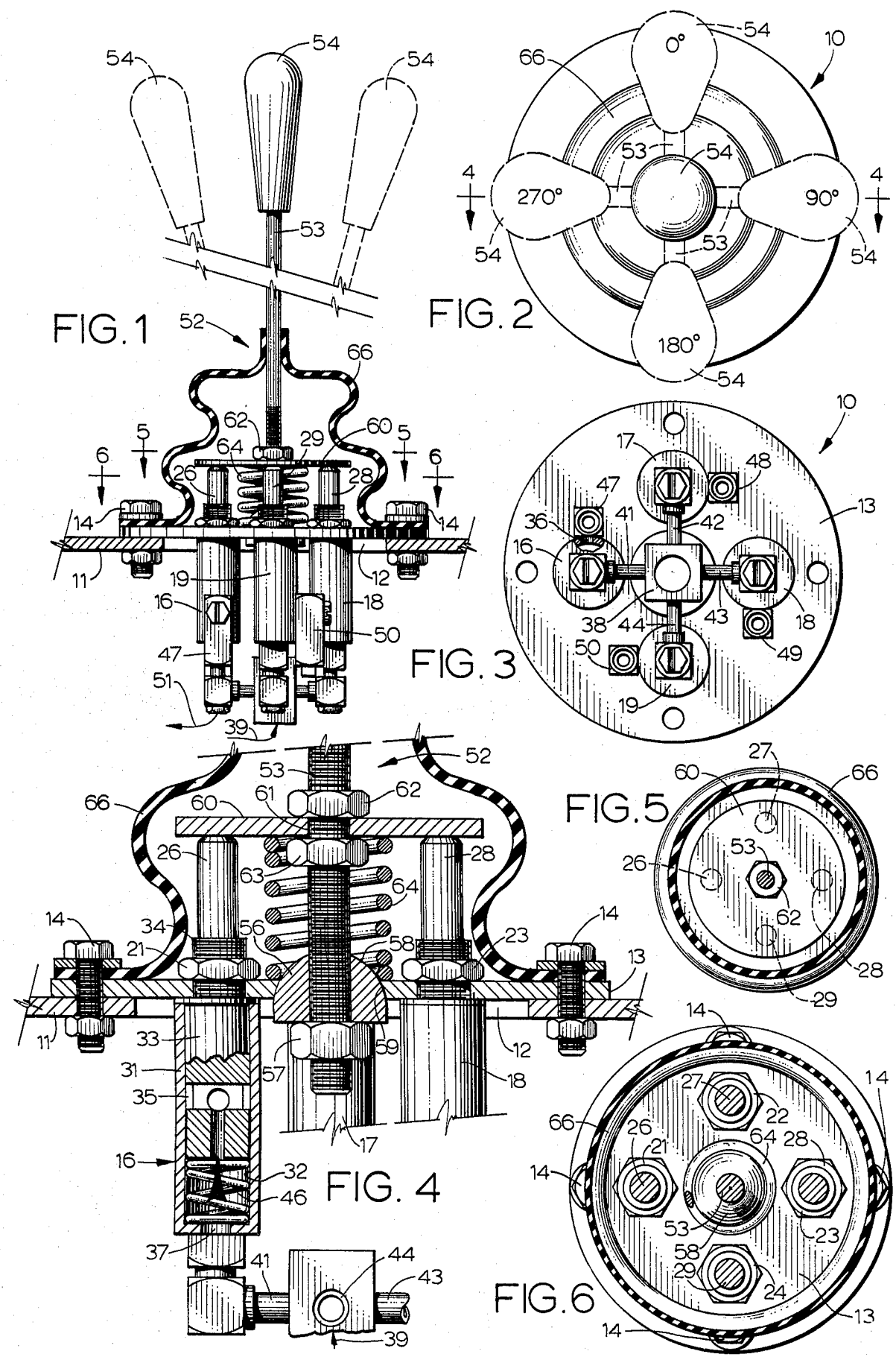

VALVE CONTROL ASSEMBLY

FIELD OF INVENTION

The invention relates to a control apparatus for actuating one or more fluid responsive devices. The control apparatus is a joy stick controlled actuator for a plurality of air valves operable to actuate one or more hydraulic valves.

BACKGROUND OF INVENTION

Joy stick operated control valves are commonly used to remotely control a plurality of hydraulically operated units. An example of a joy stick control for a hydraulic brake system is shown by Perry in U.S. Pat. No. 2,794,609. The Perry control has a movable joy stick operable to actuate one or two valves. Springs associated with each valve return the valve to its off position and bias the joy stick to its upright position. The center of the joy stick is pivoted on a housing boss. The location of the joy stick arms relative to the valves is not adjustable. The valves are specially designed to operate within bores in the housing. The prior art control valves have longitudinally movable valving members that are designed to operate within a support housing. Conventional spool valves are not utilized.

SUMMARY OF INVENTION

The invention relates to a fluid control apparatus having a support means provided with a circular edge surrounding a hole, a plurality of valve means connected to fluid under pressure are mounted on the support means. Each valve means has an actuator spaced from the hole. Control means is movable to move one or more of the actuators to an open position allowing fluid to flow through said valve means. The control means has a first member located in said hole and engageable with said edge means. A rod means secured to the first member carries a second member. The second member is located adjacent the actuators and moves said one or more of the actuators on movement of the rod means from its neutral position. A biasing means surrounding the rod means engages the support means and second member to bias the rod means to its neutral position.

The preferred embodiment of the fluid control apparatus has a support plate adapted to be mounted on a fixed member, such as a floor or wall. The plate has a circular edge surrounding a hole. The circular edge has a tapered concave surface. A plurality of valve units are mounted on the plate around the hole. Each valve unit has a valve body having a chamber accommodating a reciprocating spool. Actuators secured to each spool project from the valve body. The actuators are laterally spaced from the hole. Fluid inlet line means and outlet line means are connected to the valve body. Linear movement of the actuators moves the spools to their open positions, thereby allowing fluid under pressure to flow through the valve units. The air is used to actuate air cylinders operatively connected to hydraulic actuators. A joy stick control means having 360-degree pivotal movement is used to selectively actuate one or more of the actuators to control the flow of fluid through the valve units. The control means has a first or bearing member located in the hole. The first member has a convex semi-spherical outer surface engageable with the tapered concave surface of the hole, providing a bearing and pivotal surface for the first member. A rod is secured to the first member. The rod has an end supporting a hand grip operable to facilitate manual movement of the rod. A second member adjustably mounted on the rod is engageable with the actuators on pivotal movement of the rod. Adjustable means on the rod are operable to adjust the position of the second member relative to the actuators and secure the second member to the rod. The rod is biased to a neutral position with a coil spring located between the plate and second member about the rod. The coil spring acts independently of the valve units and holds the rod in a neutral position generally parallel to the direction of the linear movement of the actuators.

The fluid control apparatus is used to provide a remote control for actuating one or more hydraulic valves. The fluid control apparatus is operable to selectively or concurrently control two hydraulic valves so that two hydraulic functions can be simultaneously controlled. The control apparatus is useable with any hydraulic valve that is pneumatically actuated. The control apparatus is economical in construction and versatile in use. It can accommodate different types and sizes of pneumatic valves and is adjustable to control the sensitivity and actuation of the pneumatic valves.

IN THE DRAWINGS

FIG. 1 is an elevational view of the fluid control apparatus of the invention mounted on a support plate;

FIG. 2 is a top view of FIG. 1;

FIG. 3 is a bottom view of FIG. 1 removed from the support plate;

FIG. 4 is an enlarged shortened sectional view taken along the line 4—4 of FIG. 2;

FIG. 5 is a sectional view taken along the line 5—5 of FIG. 1; and

FIG. 6 is an enlarged sectional view taken along the line 6—6 of FIG. 1.

DESCRIPTION OF PREFERRED EMBODIMENT

Referring to FIGS. 1 and 4, there is shown the fluid control apparatus of the invention indicated generally at 10 for controlling air under pressure to one or more receivers, such as an actuator mechanically coupled to a spool of a hydraulic valve. Fluid control apparatus 10 is mounted on a support plate 11, such as a floor, wall, panel or the like. Support plate 11 has a hole 12 covered with a base or circular plate 13. A plurality of nut and bolt assemblies 14 secure plate 13 to support plate 11.

As shown in FIGS. 3 and 6, four valve units 16, 17, 18, and 19 are secured to plate 13 with nuts 21, 22, 23, and 24. Valve units 16, 17, 18, and 19 are conventional linearly actuated spool valves operable to control the flow of a fluid, as air, in separate fluid circuits. Valve units 16, 17, 18, and 19 are circumferentially spaced from each other around a common circle concentric with the center of plate 13. Preferably, adjacent valve units are spaced 90 degrees from each other. Each valve unit 16, 17, 18, and 19 has an upwardly directed actuator 26, 27, 28, and 29 adapted to be linearly moved to actuate the valve units to their on and off positions. Valve units 16, 17, 18, and 19 are identical in structure and operation.

Referring to FIG. 4, there is shown a detailed arrangement of valve unit 16. Valve unit 16 has a cylindrical body 31 having a linear chamber 32. A spool 33 is slidably disposed in chamber 32 and connected at its upper end to actuator 26. Actuator 26 extends through a threaded neck 34 accommodating nut 21. Neck 34 extends through holes in plate 13 so that nut 21 mounts the valve unit 16 on plate 13. Nut 21 can be removed from neck 34 thereby allowing the entire valve unit 16 to be removed from plate 13. Spool 33 has a circumferential passage 35 open to the bottom of the spool. Passage 35 is adapted to be located in alignment with an outlet port 36, as shown in FIG. 3, to open the valve unit when actuator 26 is depressed or pushed down.

The bottom of body 31 has an inlet port 37 connected to an air supply manifold 38. The manifold 38 is coupled with suitable tubing or pipes (not shown) carrying air under pressure, as shown by arrow 39, to manifold 38. Manifold 38 is connected to each of the valve units 16, 17, 18, and 19 with short tubes 41, 42, 43, and 44, as shown in FIG. 3. Returning to FIG. 4, a coil spring 46 biases spool 33 to the upper closed position. When spool 33 is in the closed position, the outlet port 36 is blocked. Valve unit 16, as shown in FIG. 4, is an example of a linearly operated spool valve useable with the invention. Other types of valves having linearly movable actuators are useable with fluid control apparatus 10.

As shown in FIG. 3, air outlet members or couplings 47, 48, 49, and 50 are attached to the sides of valve units 16, 17, 18, and 19, respectively. Each coupling 47, 48, 49, and 50 has a bottom opening adapted to be attached to a pipe or tube for carrying air, as shown by arrow 51 in FIG. 1, to a desired location, such as a piston and cylinder assembly for operating hydraulic valves so that two hydraulic functions can be controlled. Couplings 47–50 can be connected to any type of hydraulic valve that is pneumatically actuated.

An actuator control indicated generally at 52, in FIGS. 1, 2 and 4, is used to selectively operate each valve unit 16, 17, 18, and 19 individually or simultaneously operate adjacent pairs of valve units. Actuator control 52 comprises an upright linear rod 53, known as a joy stick. A handle 54 attached to the upper end of rod 53 provides a convenient hand grip for moving rod 53. As shown in FIG. 4, a bearing member 56 is threaded onto the lower end of rod 53. A lock or jam nut 57 threaded onto rod 53 bears against the bottom of bearing member 56 to fix the location of bearing member 56 on rod 53. Bearing member 56 has a convex upper surface 58. Surface 58 has a semi-spherical or dome shape. Bearing member 56 is located in a central hole in plate 53. The hole is formed by an annular edge or surface 59 that has an upwardly tapered concave shape that conforms to the shape of the convex surface 58 of bearing member 56. In an upright direction, as shown in FIG. 4, surface 59 has a slight concave curve that is complementary to the curvature of the convex surface 58 of bearing member 56. Bearing member 56 is in surface engagement with the annular surface 59 to form a dome and socket structure allowing 360-degree pivotal movement of rod 53 in vertical planes relative to plate 13.

A plate member or disc 60 has a center hole 61 accommodating rod 53. A pair of nuts 62 and 63 secure plate 60 to rod 53. Nuts 62 and 63 can be turned on rod 53 to adjust the location of plate 60 on rod 53. Plate 60 is secured to rod 53 above bearing member 56 with plate 60 located adjacent the upper ends of the valve actuators 26–29 when the actuators are in their up or off positions. Plate 60 is adjustable on rod 53 to adjust the clearance between the ends of actuator 26–29 and plate 60 and accommodate different styles of actuators.

A coil spring 64 is concentrically positioned about rod 53 between plate 60 and support plate 13. As shown in FIG. 4, the upper end of spring 64 fits around nut 63. The lower end is located about the bearing member 56. Spring 64 biases plate 60 upwardly to a general horizontal position and parallel to support plate 13. This locates rod 53 in an upright neutral position.

A flexible boot 66 located about the lower portion of rod 53 covers plate 60 and valve actuators 26–29. The nut and bolt assemblies 14 secure the lower end of boot 66 to plate 13.

In use, referring to FIG. 2, control rod 53 can be selectively moved in the directions indicated by 0 degrees, 90 degrees, 180 degrees, and 270 degrees. This will selectively actuate one of valve units 16, 17, 18, and 19. The amount of lateral pivotal movement of rod 53 will control the amount of air that is allowed to flow through the valve unit. In other words, when control rod 53 is moved to its full lateral position, the actuator, such as actuator 26, is moved to its full down position completely opening exhaust port 36. This allows for the maximum amount of air to flow through the valve unit to the receiver. Control rod 53, when it is angularly moved, tilts plate 60, thereby depressing the actuator, such as actuator 26. When the operator releases handle 54, spring 64 will return rod 53 to its upright neutral position. The valve units that were open will automatically close due to the air pressure in the bottom of body chamber 32 and the biasing of valve spring 46.

The control rod 52 can be moved in directions intermediate the 0 and 90 directions, such as 45 degrees. This will actuate adjacent pairs of valve units 17 or 18. Disc 60 will be angularly moved to simultaneously depress two actuators, such as actuators 27 and 28, to open valve units 17 and 18. The degree of actuation of the adjacent valve units 17 and 18 relative to each other can be regulated by circumferentially moving the control rod 52 toward one of the units. This will further depress one actuator, thereby increasing the air flow through the associated valve unit and decreasing the air flow through the adjacent valve unit. When the operator releases handle 54, spring 64 returns rod 53 to its upright neutral position. Valve units 17 and 18 will automatically close due to air pressure in chamber 32 and the biasing of valve spring 46.

While there has been shown and described the preferred embodiment of the fluid control device of the invention, it is understood that changes in the structures, valve units, and size of the structure can be made by those skilled in the art without departing from the invention. The invention is defined in the following claims.

The embodiments of the invention in which an exclusive property or privilege is claimed are defined as follows:

1. A fluid control apparatus comprising:
support means having circular edge means surrounding a hole, a plurality of valve means mounted on the support means, each of said valve means having a movable actuator spaced from said hole, said actuator being movable between an open first position allowing fluid to flow through the valve means and a closed second position blocking flow of fluid through the valve means, control means cooperating with the support means and each actuator operable for selectively moving one or more of said actuators from the first position to the second position, said control means having a first member located in said hole and engageable with said edge means, rod means secured to the first member, a second member mounted on the rod means engageable with said actuators, and biasing means located around the rod means engageable with the support means and second member to bias the first member into bearing engagement with the circular edge means and the rod means to a neutral position wherein the actuators are in the second position.

2. The apparatus of claim 1 wherein:
the support means comprises a generally flat plate having said circular edge means surrounding said hole, and said first member having annular surface means engageable with said circular edge means, said biasing means biasing the annular surface means into bearing engagement with the circular edge means.

3. The apparatus of claim 1 wherein:
said first member has a convex semi-spherical outer surface, and said circular edge means has a tapered curved surface engaged by the outer surface of the first member.

4. The apparatus of claim 1 wherein:
the second member has a hole accommodating the rod means, and means mounting the second member on the rod means.

5. The apparatus of claim 4 wherein:
the means mounting the second member on the rod means include adjustable members operable to change the position of the second member relative to the rod means.

6. The apparatus of claim 1 wherein:
each of said valve means has a body mounted on the support means, each body having a chamber, fluid inlet means and fluid outlet means connected to each body, valving spool means located in each chamber, an actuator secured to each spool means, and biasing means for retaining the spool means in a position to block the flow of fluid through the valve means, said second member being engageable with the actuator and movable on movement of the rod means to move the spool means to a position to allow fluid to flow through the valve means.

7. The apparatus of claim 6 wherein:
each actuator extends generally parallel to the rod means when the rod means is in its neutral position.

8. The apparatus of claim 1 wherein:
the biasing means comprises a coil spring having a first end in engagement with the support means and a second end in engagement with the second member.

9. The apparatus of claim 1 including:
means adjustably mounting the second member on the rod means operable to change the position of the second member relative to the rod means and actuators.

10. The apparatus of claim 1 wherein:
said first member has a convex semi-spherical outer surface, said circular edge means has a tapered curved surface engaged by the outer surface of the first member, each of said valve means has a body mounted on the support means, fluid inlet means and fluid outlet means connected to each body, valving means located within each body connected to an actuator and movable with said actuator to open and closed positions in response to pivotal movement of the rod means.

11. The apparatus of claim 10 wherein:
the second member has a hole accommodating the rod means, and means mounting the second member on the rod means.

12. The apparatus of claim 11 wherein:
the means mounting the second member on the rod means include adjustable members operable to change the position of the second member relative to the rod means.

13. The apparatus of claim 10 wherein:
each actuator extends generally parallel to the rod means when the rod means is in its neutral position.

14. The apparatus of claim 10 wherein:
the biasing means comprises a coil spring having a first end in engagement with the support means and a second end in engagement with the second member.

15. The apparatus of claim 10 including:
means adjustably mounting the second member on the rod means operable to change the position of the second member relative to the rod means and actuators.

16. The apparatus of claim 1 wherein:
said plurality of valve means comprise four valves concentrically located about said hole in the support means.

17. The apparatus of claim 1 wherein:
said support means has a plurality of second holes accommodating said valve means.

* * * * *